UNITED STATES PATENT OFFICE.

JAKOB SCHMID AND JOHANNES MOHLER, OF BASLE, SWITZERLAND, ASSIGNORS TO THE SOCIETY OF CHEMICAL INDUSTRY IN BASLE, OF SAME PLACE.

VIOLET-BLUE INDULINE DYE.

SPECIFICATION forming part of Letters Patent No. 491,378, dated February 7, 1893.

Application filed August 25, 1892. Serial No. 444,102. (No specimens.) Patented in France March 12, 1892, No. 220,102.

*To all whom it may concern:*

Be it known that we, JAKOB SCHMID and JOHANNES MOHLER, citizens of Switzerland, residing at Basle, Switzerland, have invented new and useful Improvements in the Production of a Violet-Blue Induline Coloring-Matter or Dye-Stuff, (for which we have received Letters Patent in France, No. 220,102, dated March 12, 1892,) of which the following is a specification.

Our invention relates to the production of a violet blue induline coloring matter soluble in water, by condensation of alpha-nitro-alpha-naphthylamine (1.4) (*Liebermann Annalen* 183,232) with para-phenylene-diamine in presence of muriatic acid or benzoic acid.

In carrying out our invention practically we proceed as follows: Twenty kilos of para-phenylene-diamine and six to eight kilos of hydro-chlorate of para-phenylene-diamine are melted at a temperature of from 160° to 165° centigrade in an iron vessel supplied with agitator and refrigerator. Within two hours: Eight kilos of alpha-nitro-alpha-naphthylamine (1.4) are introduced and the formation of the coloring matter begins under separation of water and ammonia. In place of alpha-nitro-alpha-naphthylamine (1.4) alpha-nitro-beta-naphthylamine (*Friedländer Berichte* tome XXV p. 2077) may be employed. The temperature is to be maintained at from 180° to 190° centigrade for some hours, until the mass has thickened and until a test sample shows a metallic luster and a blue-violet coloration in a solution of muriatic acid. The melt is dissolved in hot water under addition of twenty kilos of muriatic acid, filtered and fixed with common salt. The dye-stuff precipitates in the form of red-brown flakes which are filtered, pressed and dried. The hydrochlorate of the coloring matter is a glittering powder of metallic luster, which dissolves easily in water and alcohol with a red-violet, in concentrated sulphuric acid with a green color and which is insoluble in ether, benzene, and chloroform. It dyes violet-blue the cotton mordanted with tannin as well as the unmordanted cotton. The tints resist well light and washing.

What we claim as new and desire to secure by Letters Patent is:

1. The within described process of producing a violet-blue induline dye-stuff which consists in melting a mixture of para-phenylene-diamine, hydro-chlorate of para-phenylene-diamine and alpha-nitro-naphthylamine at a temperature of from 160° to 190° centigrade, then dissolving the melt in dilute muriatic acid and finally precipitating by means of common salt, substantially as described.

2. As a new product, the violet-blue coloring matter which can be derived from a mixture of para-phenylene-diamine, hydro-chlorate of para-phenylene diamine and alpha-nitro-naphthylamine and which is a glittering powder of metallic luster, insoluble in ether, benzene and chloroform, but easily soluble in water and alcohol with a red-violet and in concentrated sulphuric acid with a green color.

In testimony whereof we have hereunto set our hands in the presence of two subscribing witnesses.

JAKOB SCHMID.
JOHANNES MOHLER.

Witnesses:
GEORGE GIFFORD,
F. WALTER.